April 25, 1967  R. D. KLUCK  3,315,394
STRETCH-ON LICENSE PLATE FRAME
Filed April 1, 1965

Richard D. Kluck
INVENTOR.

BY *Clarence A. O'Brien*
*and Harvey B. Jacobson*
Attorneys

United States Patent Office 3,315,394
Patented Apr. 25, 1967

3,315,394
STRETCH-ON LICENSE PLATE FRAME
Richard D. Kluck, 4583 N. Elston, Chicago, Ill. 60630
Filed Apr. 1, 1965, Ser. No. 444,591
3 Claims. (Cl. 40—209)

This invention relates generally to an attachment for vehicle license plates and more particularly to a resilient stretch-on protector for a vehicle license plate provided with means to be fitted about the marginal edges of an associated license plate and also means for securing a transparent sheet in contiguous relationship to the face of the license plate to protect the same.

Another object of this invention is to provide a stretch-on license plate protector frame of the character described which is provided with means for protecting the exposed ends of fasteners used to secure the associated license plate to a vehicle.

Still another object of this invention is to provide a stretch-on license plate protector frame which is simple in design, relatively inexpensive to manufacture and adapted to be molded in one piece in a manner providing a continuous U-shaped channel around the inside edge of the frame for receiving the corresponding marginal edges of the associated license plate.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
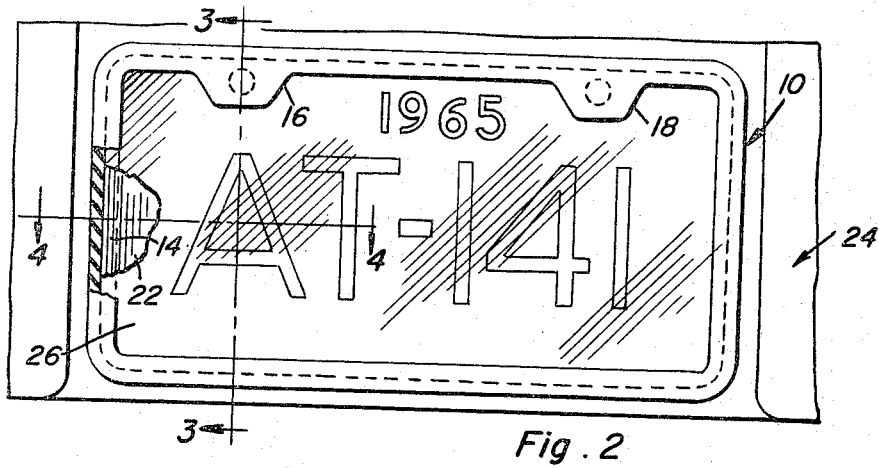
FIGURE 1 is a front elevational view illustrating the protective frame of the instant invention in position on a license plate.

Referring now to the drawings in detail, the stretch-on license plate protector of the instant invention is indicated generally at 10, and defines a resilient integral marginal frame 12 molded in one continuous piece of resilient material such as rubbery, vinyl, or other suitable plastic material. The frame 12 has a U-shaped groove 14 extending around its inner periphery for receiving the marginal edges of the license plate to be protected thereby.

The frame 12 is further provided with a pair of integral flaps 16 and 18 which project inwardly from the frame 12 in a plane parallel to the face of the license plate 22 in overlying relationship to the ends of the fasteners 20 utilized to secure the license plate 22 to a vehicle a portion of a vehicle which is indicated at 24.

Figure 2:
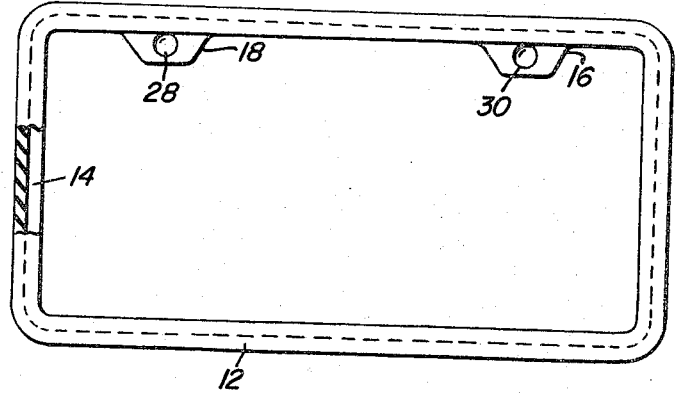
FIGURE 2 is a rear elevational view of the protective frame with portions broken away and shown in vertical section illustrating the U-shaped groove around the inner periphery of the frame.
Figure 3:
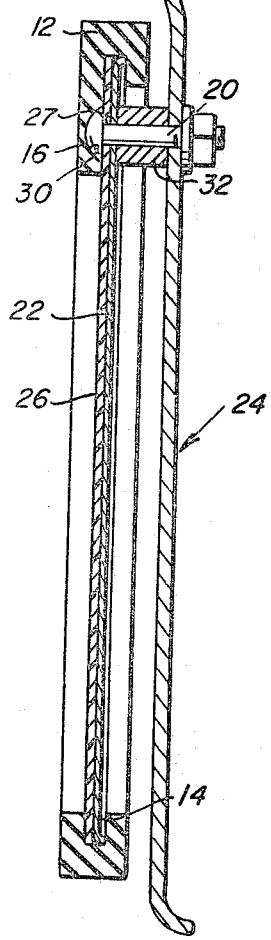
FIGURE 3 is an enlarged vertical sectional view taken substantially along the plane of the line 3—3 of FIGURE 1, further showing a preferred means of securing a license plate utilizing this device to a vehicle.
Figure 4:
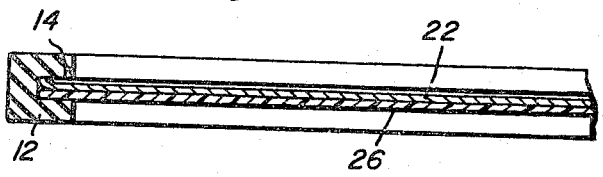
FIGURE 4 is an enlarged fragmentary horizontal sectional view taken substantially along the plane of the line 4—4 of FIGURE 1.

The protector 10 includes a transparent sheet 26 which is carried by the resilient frame 12 within the groove 14 as seen best in FIGURE 3. The transparent sheet 26 is provided with suitable apertures 27 to permit passage of the fasteners 20 therethrough. Additionally, as seen best in FIGURES 2 and 3, the integral flaps 16 and 18 are provided with concave recesses 28 and 30 on their inwardly facing portions adapted to receive the headed ends of the fasteners 20. Further, the resilient frame 12 is molded in such a manner that the frame 12 securely contacts the opposed surfaces of the license plate 22 and the transparent sheet 26, as well as the ends of the fasteners 20 to protect the face of the license plate 22 and the ends of the fasteners 20 from the ravages of the weather.

Fiber spacers 32, one of which is shown in FIGURE 3, are preferably provided to maintain the license plate 22 in spaced apart relationship from the vehicle 24 to facilitate placement of the stretch-on license plate protector 10 thereon.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a stretch-on license plate protector comprising a resilient integral marginal frame having an inwardly opening groove extending around its outer periphery for receiving the marginal edges of a license plate to be protected, a transparent sheet carried by said frame having its peripheral edge portions received in corresponding positions of said groove and adapted to be disposed in contiguous relationship to the face of a license plate also having its peripheral edge portions received in said groove, a pair of integral flaps projecting inwardly from said marginal frame and adapted to overlie the adjacent ends of fasteners utilized to secure the license plate to a vehicle, said flaps being provided with concave recesses adapted to receive the adjacent ends of said fasteners.

2. In combination a stretch-on license plate protector comprising a resilient integral marginal frame, said frame being a continuous channel member and having an inwardly facing U-shaped cross-section configuration, said U-shaped cross-sectional configuration defining a groove adapted to embracingly receive and protect the peripheral edges of a license plate, a pair of integral flaps projecting inwardly from said U-shaped marginal frame adapted to overlie the adjacent ends of fasteners utilized to secure the license plate to a vehicle, and a transparent sheet carried by said frame within said groove, said transparent sheet being adapted to be disposed in contiguous relationship to the face of the license plate, said integral flaps being provided with concave recesses adapted to receive the adjacent ends of said fasteners.

3. The combination of claim 2 wherein the transparent sheet is provided with suitable apertures to permit passage therethrough of the fasteners securing the license plates to the vehicle.

References Cited by the Examiner
UNITED STATES PATENTS

| | | | |
|---|---|---|---|
| 1,752,883 | 4/1930 | Busenbark | 40—209 |
| 1,778,636 | 10/1930 | Herbert | 40—152.1 |
| 1,879,906 | 9/1932 | Lindstrom | 40—209 |
| 2,197,676 | 4/1940 | Barth | 40—209 |
| 2,910,793 | 11/1959 | Helmer et al. | 40—209 |

EUGENE R. CAPOZIO, *Primary Examiner.*
W. J. CONTRERAS, *Assistant Examiner.*